United States Patent
Riegger et al.

(10) Patent No.: US 11,446,987 B2
(45) Date of Patent: Sep. 20, 2022

(54) ARRANGEMENT, AND METHOD FOR PRODUCING AN ARRANGEMENT, FOR A DARKENING DEVICE FOR A VEHICLE ROOF, AND VEHICLE ROOF FOR A MOTOR VEHICLE

(71) Applicant: Webasto SE, Stockdorf (DE)

(72) Inventors: Marian Riegger, Stockdorf (DE); Bernhard Braun, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 8 days.

(21) Appl. No.: 17/093,712

(22) Filed: Nov. 10, 2020

(65) Prior Publication Data

US 2021/0155085 A1 May 27, 2021

(30) Foreign Application Priority Data

Nov. 26, 2019 (DE) .......................... 102019131964.1

(51) Int. Cl.
*B60J 1/20* (2006.01)
*B60J 7/00* (2006.01)

(52) U.S. Cl.
CPC ............ *B60J 1/2061* (2013.01); *B60J 7/0015* (2013.01)

(58) Field of Classification Search
CPC ...... B60J 1/2061; B60J 1/2044; B60J 1/2027; B60J 1/2025; B60J 7/0015; B60J 7/0023
USPC ...... 296/97.8, 219, 214; 160/DIG. 2, DIG. 3
See application file for complete search history.

(56) References Cited

U.S. PATENT DOCUMENTS

| 1,735,699 | A | * | 11/1929 | Shelton | ................... B60J 1/2072 |
| | | | | | 296/97.8 |
| 6,848,493 | B1 | | 2/2005 | Hansen et al. | |
| 7,025,414 | B2 | | 4/2006 | Hanke | |
| 9,038,699 | B2 | | 5/2015 | Bergmiller et al. | |
| 2009/0165965 | A1 | * | 7/2009 | Bergmiller | ............. B60J 1/2052 |
| | | | | | 160/370.21 |
| 2012/0160429 | A1 | * | 6/2012 | Lin | ........................... E06B 9/42 |
| | | | | | 160/291 |
| 2014/0202645 | A1 | * | 7/2014 | Lin | ........................ B60J 1/2091 |
| | | | | | 160/370.21 |
| 2016/0031297 | A1 | | 2/2016 | Maier | |

(Continued)

FOREIGN PATENT DOCUMENTS

| DE | 10146284 A1 | 9/2001 |
| DE | 10237231 A | 8/2002 |

(Continued)

*Primary Examiner* — Jason S Morrow
*Assistant Examiner* — Wenwei Zhuo
(74) *Attorney, Agent, or Firm* — Fitch, Even, Tabin & Flannery, LLP

(57) ABSTRACT

An arrangement for a darkening device for a vehicle roof having a tension bow and a coupling, said coupling including at least one coupling recess and being coupled to the tension bow at an elongate end thereof. The arrangement has a drive cable and a cable attachment which includes at least one coupling recess and which is coupled thereto at an elongate end of the drive cable. Moreover, the arrangement may have at least one coupling pin which extends in each case into the coupling recess of the coupling and into the coupling recess of the cable attachment and connects the coupling to the cable attachment and couples the tension bow to the drive cable, so that the tension bow can be moved in a predefined manner by the drive cable.

16 Claims, 8 Drawing Sheets

(56) References Cited

U.S. PATENT DOCUMENTS

2017/0297419 A1\* 10/2017 Ten-Jet-Foei ............ B60J 7/067
2020/0282814 A1\* 9/2020 Alban .................... B60J 1/2069

FOREIGN PATENT DOCUMENTS

DE 102006017538 A1 10/2007
DE 102014215154 A1 2/2016

\* cited by examiner

ARRANGEMENT, AND METHOD FOR PRODUCING AN ARRANGEMENT, FOR A DARKENING DEVICE FOR A VEHICLE ROOF, AND VEHICLE ROOF FOR A MOTOR VEHICLE

Arrangement, and method for producing an arrangement, for a darkening device for a vehicle roof, and vehicle roof for a motor vehicle

CROSS-REFERENCE TO RELATED APPLICATION

This application claims priority from German Patent Application Number DE 10 2019 131 964.1, filed Nov. 26, 2019, which is hereby incorporated herein by reference in its entirety for all purposes.

FIELD

The present invention relates to an arrangement for a darkening device for a vehicle roof which exhibits a reliable degree of stability and helps minimize malfunctions during operation of the darkening device. The invention further relates to a method for producing an arrangement of this kind and to a vehicle roof having an arrangement of this kind.

BACKGROUND

In some motor vehicles the vehicle roof has an integrated roof opening which is closed using a sliding roof system or panel made of glass, for example, so that it is possible to see out of the motor vehicle, for example. Where appropriate, the panel has a slidable or tiltable design, so that apart from offering a view, an exchange of air is facilitated when required. In order to reduce the incidence of light through a glass panel of this kind where necessary, some motor vehicles have a shading system with a sliding screen or a roller blind which is associated with the glass panel. For example, document DE 10146284 A1 describes an openable vehicle roof. Providing stable and reliable functioning of interacting components of the shading system is a constant challenge in this case.

SUMMARY

A problem addressed by the invention is that of creating an arrangement for a shading device for a vehicle roof which allows stable and reliable functionality of the shading device and, in addition, can be produced cost-effectively. A further problem addressed by the invention is that of providing a corresponding production method of an arrangement of this kind for a darkening device, and also a vehicle roof having an arrangement of this kind.

The problem is solved by the features of the independent patent claims in each case. Advantageous developments of the arrangement, and of the method, are specified in the dependent patent claims in each case.

An arrangement according to the invention for a darkening device for a vehicle roof comprises a tension bow and a coupling, said coupling including at least one coupling recess and being coupled to the tension bow at an elongate end thereof. The arrangement further comprises a drive cable and a cable attachment which includes at least one coupling recess and which is coupled thereto at an elongate end of the drive cable. Moreover, the arrangement has at least one coupling pin which extends in each case into the coupling recess of the coupling and into the coupling recess of the cable attachment and connects the coupling to the cable attachment and couples the tension bow to the drive cable, so that the tension bow can be moved in a predefined manner by means of the drive cable.

According to a particularly preferred development of the arrangement, the coupling and the cable attachment each have two coupling recesses spaced apart from one another. In addition, two coupling pins are provided which each extend into a coupling recess of the coupling and into a coupling recess of the cable attachment and connect the coupling to the cable attachment and couple the tension bow to the drive cable.

By means of the arrangement described stable and reliable operation of a darkening device can be achieved with few malfunctions. The arrangement provides a high degree of robustness by means of the coupling pins and also exhibits a substantially reduced dependence on component tolerances as compared with conventional structures. In particular, unwanted relative movements of interacting components within the assembly are avoided, or at least reduced, by means of the arrangement described.

It is known in connection with the present invention that a coupling between components of a shading system by means of clipping or latching can have a detrimental effect on the operation of the shading system. The strength of a clipping arrangement is particularly dependent on component tolerances in the region of the clipping arrangement. In addition, a coupling of this kind has a relatively low degree of robustness and causes an unclipping of components which are latched to one another. This may result in a roller system coming out of its guide track, for example. Furthermore, uncontrolled relative movements of elements which are clipped to one another may occur within an assembly of this kind, which can have a detrimental effect on the acoustics and positioning in, or on, a vehicle roof. Furthermore, this may cause an unwanted light gap to form. A stabilizing remedial measure in the form of an additional screw fixing would be cost-intensive and time-consuming to retrofit.

Disadvantageous repercussions of this kind can be avoided, or at least counteracted, by means of the arrangement described. The arrangement represents, in particular, a geometric remodelling of a coupling between a drive cable and a coupling for a darkening device. The darkening device comprises a sliding screen or a roller blind, for example, which can be moved in a controlled manner by means of the arrangement. The coupling pins facilitate a stable and reliable connection at two positions between the tension bow and the drive cable, said connection being realized using a press-in method of the coupling pins.

The following description focuses primarily on the embodiment of the arrangement with two coupling pins and two matching coupling recesses on the coupling and on the cable attachment. However, the properties and features which are described are similarly applicable to an embodiment of the arrangement with only one coupling pin.

The design of the arrangement described by means of two coupling pins and extensions which may be provided for hooking allows a stable and form-fitting coupling to be created and is particularly used for the purpose of increasing the coupling robustness of the coupling at the tension bow and the cable attachment which, particularly as a formed cable extrusion-coating, realizes a drive cable carrier.

According to a preferred development of the invention, the coupling pins are integrally configured with the coupling or integrally configured with the cable attachment by means of injection-moulding. In this way, the components can be produced cost-effectively and with minimal effort and contribute to a simple construction of the arrangement. The coupling, the coupling pins and the cable attachment are realized, in particular, as plastic formed parts, wherein the coupling pins are connected to the coupling in the region of the associated coupling opening by means of a plastic disc or a plastic film. Consequently, the integral design also helps to safeguard against loss.

When forming the coupling, the coupling pins are broken off, or separated from, the coupling in a controlled manner and pressed into the coupling recess until the coupling pins extend through the coupling into the coupling recesses of the cable attachment. The connecting plastic disc or plastic film is selectively destroyed or torn during this process, so that the coupling pins are displaced relative to the coupling and can be pressed into the coupling recesses. Alternatively, the coupling pins may also be configured on the cable attachment and, following selective separation and pressing-in through the cable attachment, extend into the coupling recesses of the coupling.

According to a further preferred embodiment of the arrangement, the coupling pins each have an end stop which is set up to define an end position when the coupling pins are introduced into the respective coupling recesses. An end stop of this kind is realized as a projecting region, for example, which extends away outwardly at one end of the respective coupling pin with respect to a longitudinal axis. The end stop is advantageously configured on the end of the respective coupling pin which is not pressed into the coupling recesses. In other words, the respective coupling pin is pressed into the coupling recesses by the end which does not have an end stop of this kind. The end stop additionally forms a point of application at which a lever tool can be fitted, for example, so that the arrangement can be dismantled easily and in a time-saving manner.

According to a further preferred development of the arrangement, the coupling and the cable attachment each have a chamfer at an end delimiting the associated coupling recess. The respective chamfer is configured as a rounded or bevelled edge and allows simple and aligned introduction of the coupling pins into the corresponding coupling recesses. Alternatively or in addition, the coupling pins have chamfers at their elongate end which is introduced into the coupling recesses. In addition, one or multiple side faces of the coupling pins may be conically formed, so that components of the arrangement are pressed towards one another, or against one another, all the more strongly, the further the coupling pins are pressed into the respective recess.

According to a further development of the arrangement, the coupling has coupling hooks which engage with the predefined recesses on, or in, the cable attachment. The coupling hooks facilitate a simple prealignment of the coupling and the cable attachment relative to one another. Subsequently, the coupling pins are pressed into the coupling recesses and fix the position of the coupling and the cable attachment relative to one another.

A darkening device according to the invention for a vehicle roof comprises an embodiment of the previously described arrangement and a shading element which is coupled to the tension bow of the arrangement and can be moved by means of the drive cable. The shading element is designed as a roller blind, in particular, which can be unwound from a shaft, and wound onto it again, by means of the tension bow. The darkening device may therefore include, in addition, a shaft of this kind and an electric motor which allows electrical driving of the drive cable and movement of the roller blind.

A vehicle roof according to the invention for a motor vehicle comprises a panel which is arranged in a roof opening in a headliner of the vehicle roof, and an embodiment of the previously described darkening device which is coupled to the headliner of the vehicle roof and assigned to the panel. The panel may be configured as a fixed glass element or as a displaceable component, for example, and set up an openable roof system.

The fact that the darkening device and the vehicle roof comprise an embodiment of the previously described arrangement means that features and properties of said arrangement are also disclosed for the darkening device and the corresponding vehicle roof, and vice versa.

A method according to the invention for producing an arrangement for a darkening device for a vehicle roof involves provision of a tension bow and provision of a coupling which has two coupling recesses spaced apart from one another. The method further involves coupling the coupling to the tension bow by attaching said coupling at an elongate end of the tension bow. The method further involves the provision of a drive cable with a cable attachment which has two coupling recesses spaced apart from one another and which is coupled to the drive cable at an elongate end thereof. The method further involves provision of two coupling pins. The method further involves positioning the coupling and the cable attachment relative to one another, so that the coupling recesses are arranged above one another or alongside one another. Moreover, the method involves introducing the coupling pins into a coupling recess of the coupling in each case and into a respective coupling recess of the cable attachment, and thereby coupling the tension bow to the drive cable, so that said tension bow can be moved in a predefined manner by means of the drive cable.

Provision of the coupling pins and the coupling, or of the coupling pins and the cable attachment, may, in particular, involve an integral design of the coupling pins with the coupling, or with the cable attachment, by means of injection-moulding.

In addition, the introduction of the coupling pins into the respective coupling recesses may involve a predefined separation of the coupling pins from the coupling, or from the cable attachment, and pressing into the respective coupling recesses.

The method described in particular makes it possible for an embodiment of the previously described arrangement to be produced, so that features and properties of the arrangement are also disclosed for the corresponding production method, and vice versa. In addition, the method can also be extended to the production of the darkening device and include provision of a darkening or shading element which is coupled to the tension bow.

BRIEF DESCRIPTIONS OF THE DRAWINGS

Exemplary embodiments of the invention are explained in greater detail with the help of the schematic drawings. In the drawings.

DETAILED DESCRIPTION

Elements with the same structure or function are referred to using the same reference numbers across all figures. For reasons of clarity, where necessary not all elements shown in all figures are provided with reference numbers.

Figure 1:
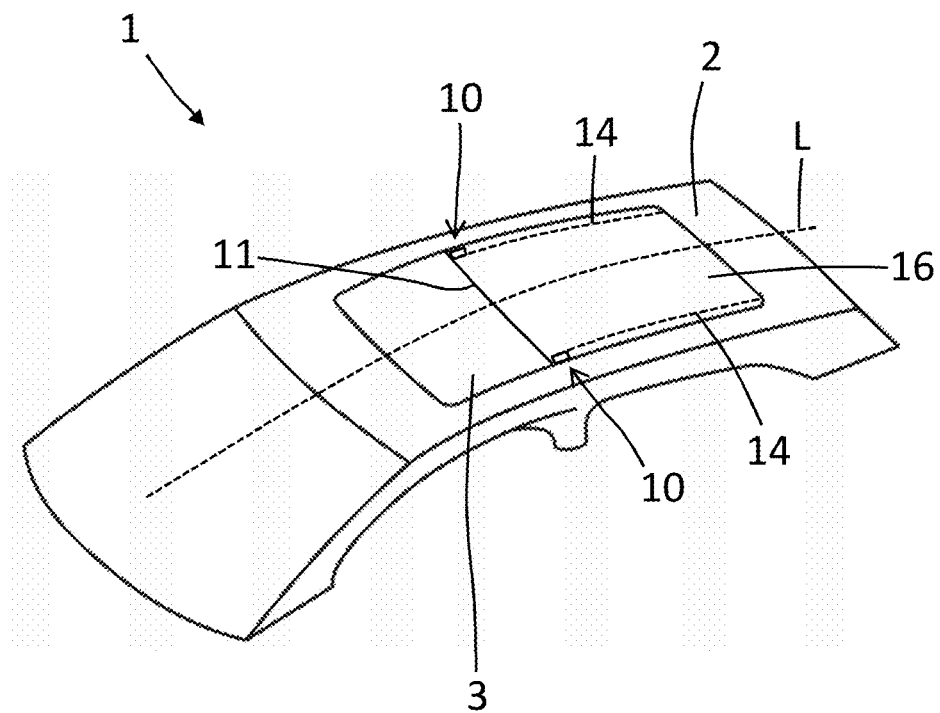
FIG. 1 shows a vehicle roof as a perspective view.
Figure 1:
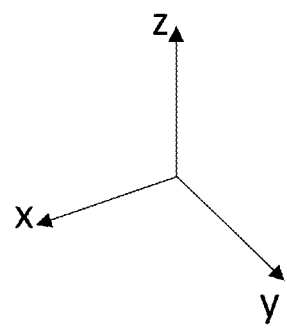

FIG. 1 shows schematically as a perspective view a vehicle roof 1 of a motor vehicle which has a panel 3 comprising a panel element in the form of a glass pane, for example. The panel may realize a fixed glass element which is immovable in respect of the vehicle roof 1 and close a roof opening in a headliner 2 of the vehicle roof 1. Alternatively, the panel 3 is designed to be movable relative to the vehicle roof 1, so that the roof opening in the vehicle roof 1 can be optionally opened and closed.

So that the incidence of light through the panel 3 into a vehicle interior of the motor vehicle can be reduced where necessary, a darkening device with a roller blind 16 is provided that can be unwound from, and wound onto, a shaft by means of a drive cable 14. As explained with the help of the following FIGS. 2 to 8, a stable and reliable operation of the darkening device with few malfunctions can be achieved simply and cost-effectively by means of an arrangement 10. The arrangement 10 described below relates to one side of the vehicle roof 1 and should be understood to relate in the manner of a mirror image to the other side of the vehicle roof 1 too, relative to a longitudinal axis L of the vehicle roof 1 in terms of the design and function of the existing elements.

FIGS. 2 to 7 show an exemplary embodiment of the arrangement 10 for the darkening device for the vehicle roof 1. The arrangement 10 comprises a tension bow 11 and a coupling 12, said coupling including two coupling recesses 17 spaced apart from one another and being coupled to the tension bow 11 at an elongate end thereof. The arrangement 10 further comprises a drive cable 14 and a cable attachment 13 which includes two coupling recesses 18 spaced apart from one another and which is coupled thereto at an elongate end of the drive cable 14. Moreover, the arrangement 10 has two coupling pins 15 which extend in each case into a coupling recess 17 of the coupling 12 and into a coupling recess 18 of the cable attachment 13 and connect the coupling 17 to the cable attachment 13 and thereby couple the tension bow 11 to the drive cable 14, so that the tension bow 11 can be moved in a predefined manner by means of the drive cable 14 in the direction of the longitudinal axis L.

Figure 2:
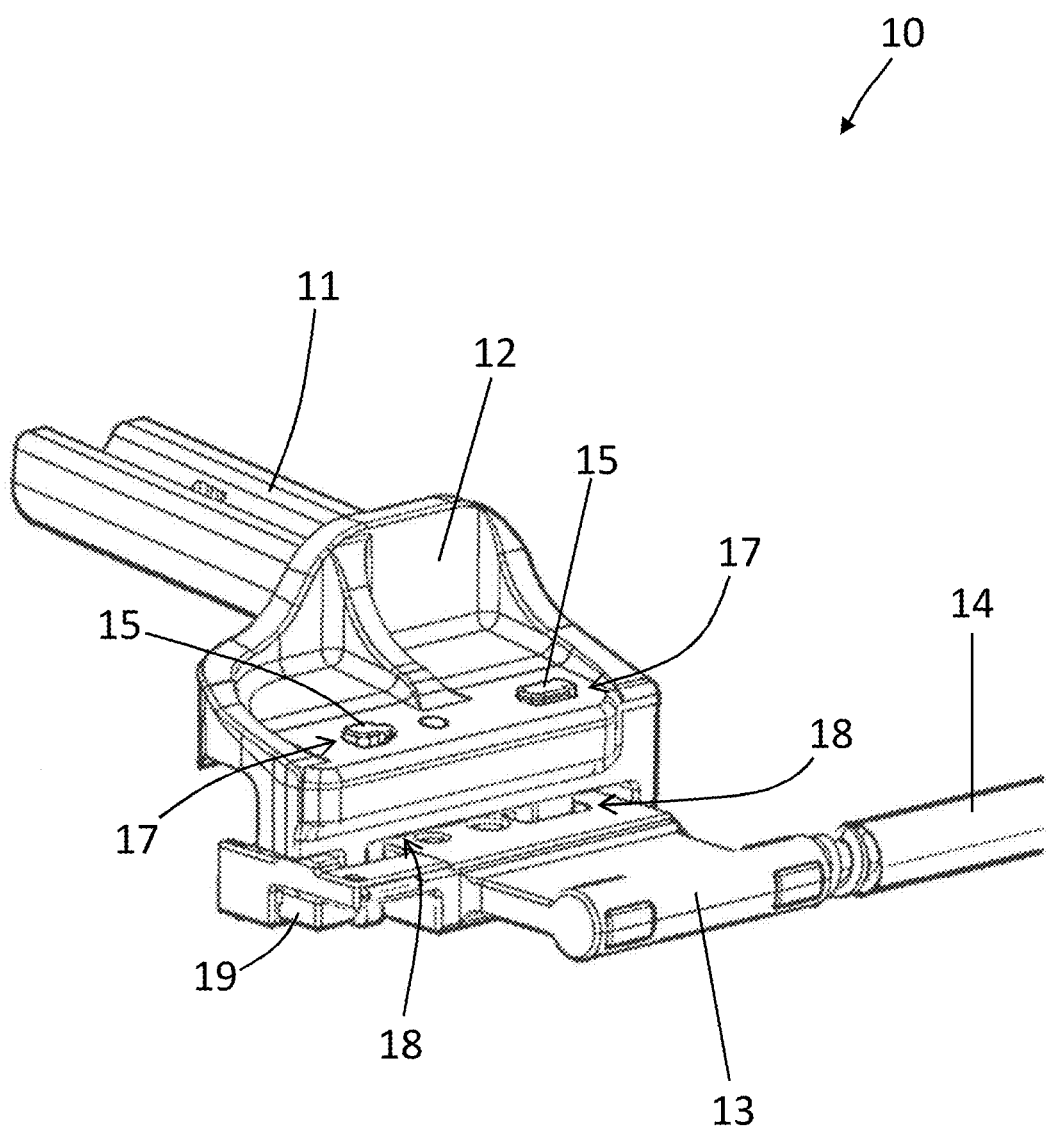
FIGS. 2-7 show an exemplary embodiment of an arrangement for a darkening device for the vehicle roof.
Figure 3:
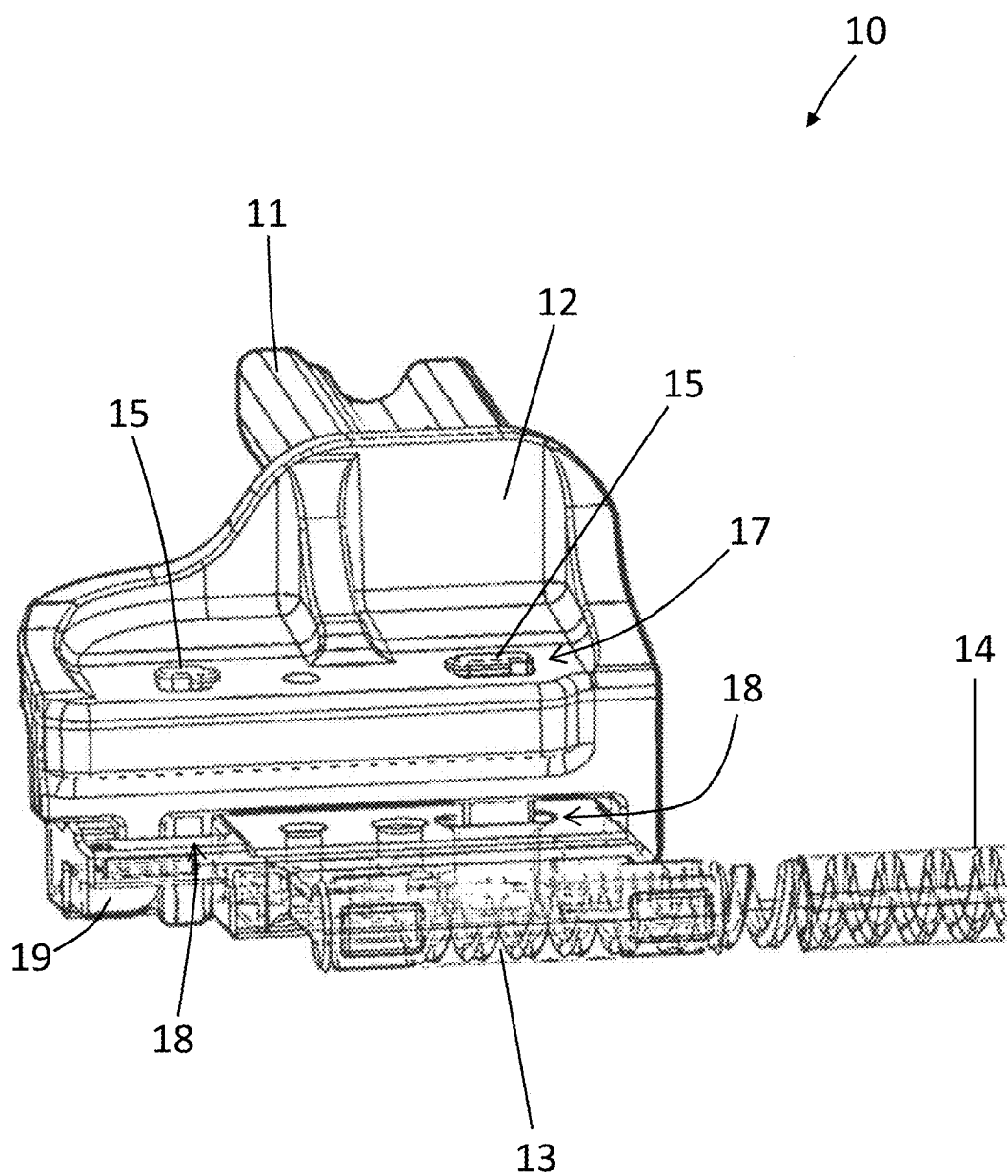

FIGS. 2 and 3 show perspective views of the arrangement 10, with the help of which it is possible to see that the coupling pins 15 have been pressed from above according to the illustrated alignment through the coupling recesses 17 and through the coupling 12, so that they extend into the coupling recesses 18 of the cable attachment 13.

Figure 4:
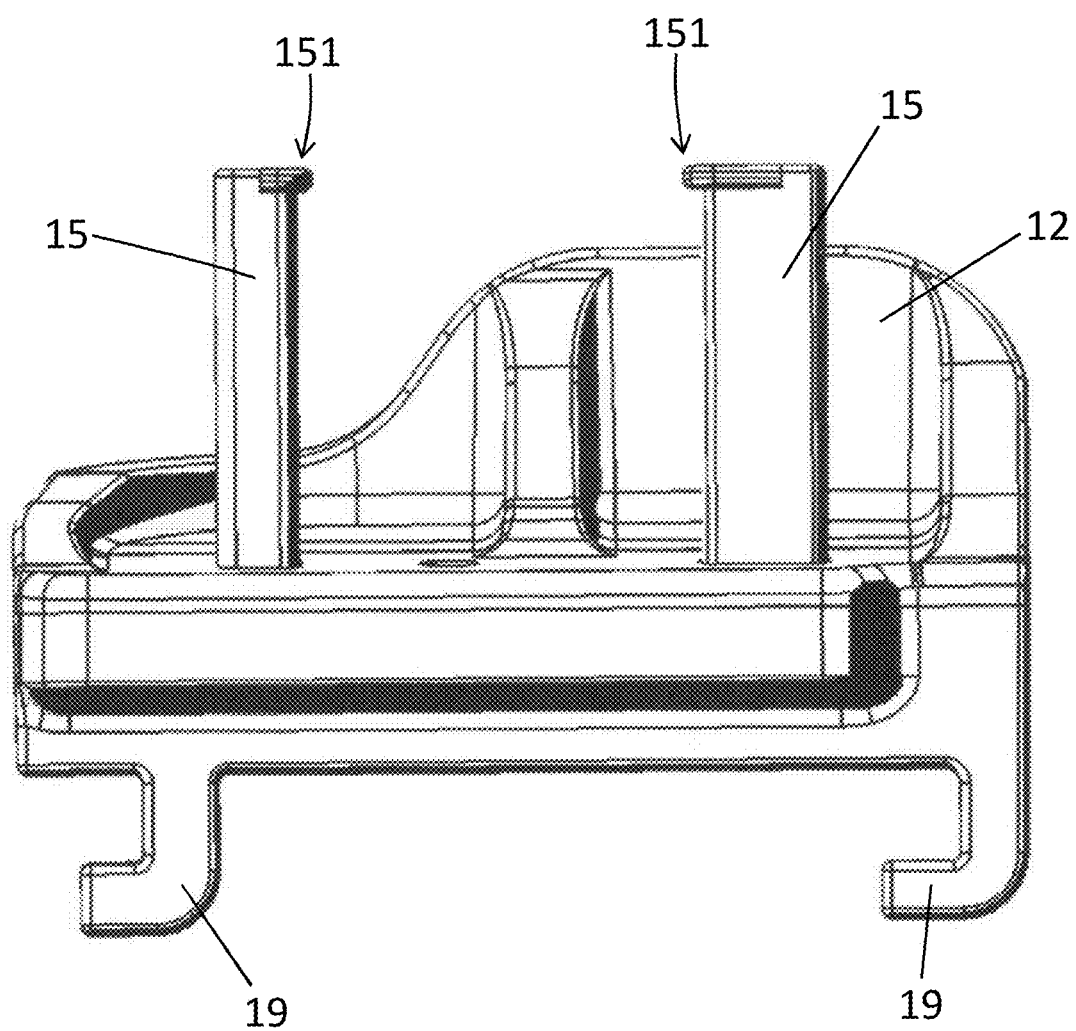
Figure 5:
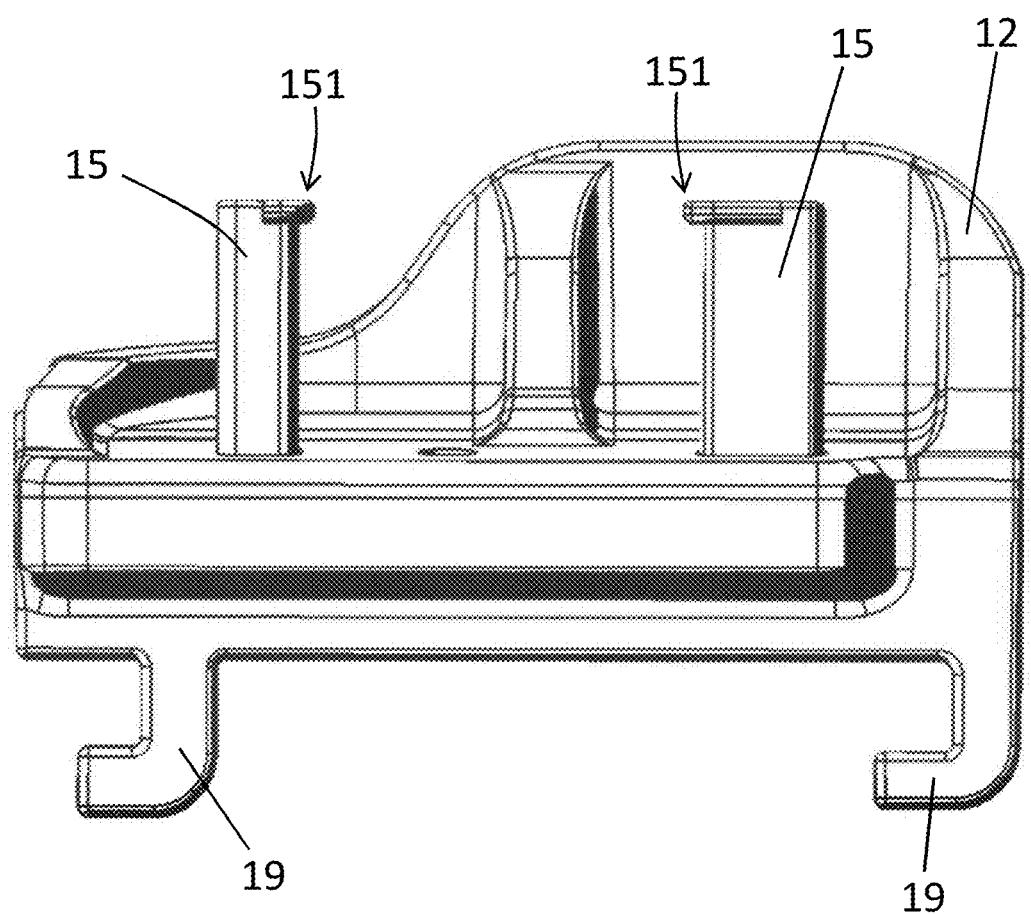
Figure 6:
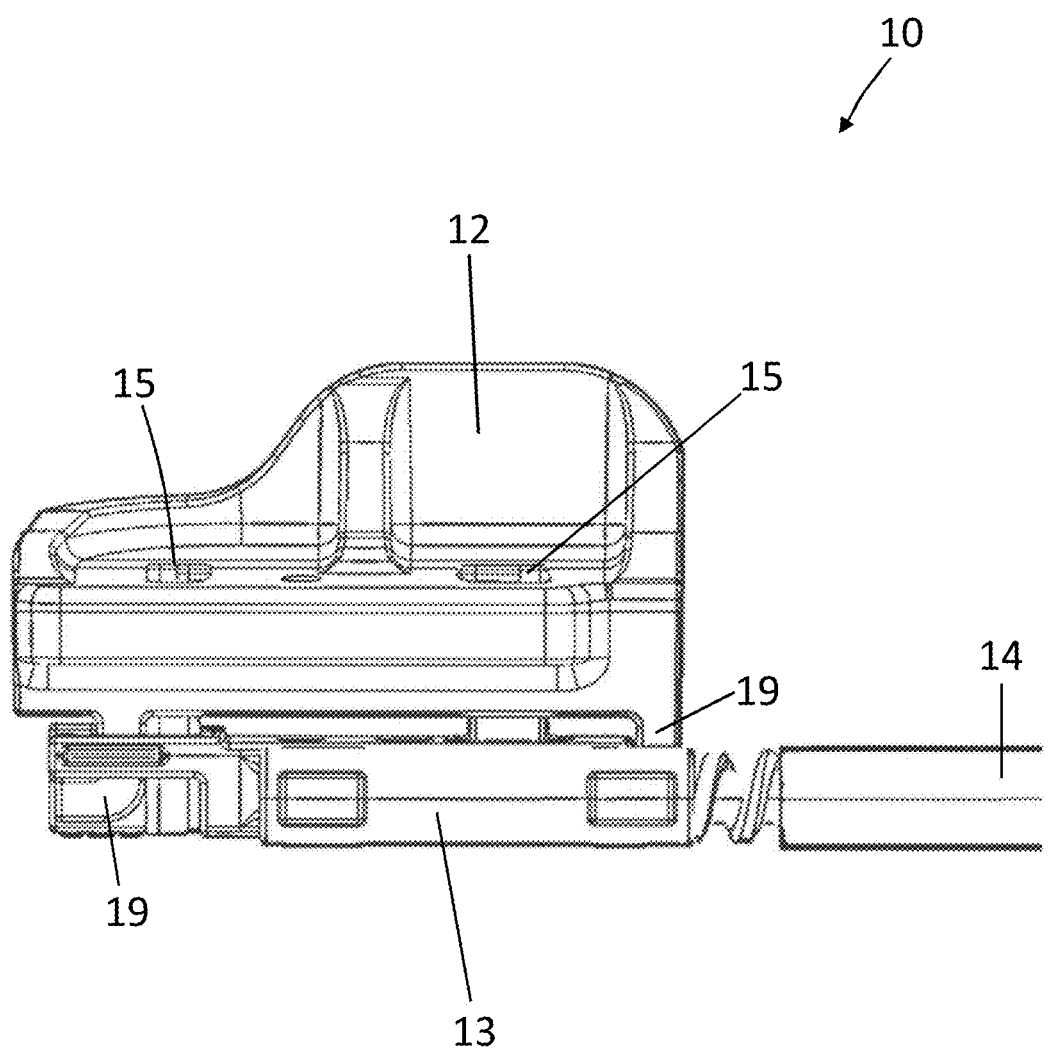

FIGS. 4 and 5 show in schematic side views the coupling and the coupling pins 15 in different press-in positions. In FIG. 4 the coupling pins 15 are not, or scarcely, pressed into the associated coupling recesses 17, 18. The coupling pins 15 are connected to the coupling by means of a plastic disc, for example, or are configured integrally therewith and fastened in a loss-proof manner. FIG. 5 shows the coupling pins 15 in a position in which they are partially pressed into the coupling recesses 17 of the coupling 12. FIG. 6 shows a pressed state of the coupling pins 15 which has been formed by the coupling pins 15 being pressed within the respective coupling recess 17 through the coupling 12 and into the coupling recesses 18 of the cable attachment 13.

The coupling pins 15 each have an end stop 151 which is set up to define an end position when the coupling pins 15 are introduced into the respective coupling recesses 17, 18. The end stop 151 in each case is configured as a projecting region at an upper end of the coupling pins 15 and extends away outwardly relative to a longitudinal axis of the coupling pins 15. Consequently, the coupling pins 15 can be reliably pressed into the coupling recesses 17 and 18 until the respective end stop 151 makes contact with an upper edge of the coupling 12. The end stop 151 also forms an advantageous point of application for simple and time-saving dismantling of the arrangement 10, on which point of application a lever tool can be fitted, for example. This can be particularly useful for the maintenance or replacement of a component of the arrangement 10.

The coupling 12 also comprises coupling hooks 19 which extend away downwardly relative to the illustrated orientations and engage with predefined recesses on, or in, the cable attachment 13. The coupling hooks 19 allow a simple prealignment of the coupling 12 and of the cable attachment 13 relative to one another and with a preassembly of this kind are passed through the respective coupling recesses 17, 18. Subsequently, the coupling pins 15 are pressed into the coupling recesses 17, 18 and fix the position of the coupling 12 and the cable attachment 13 relative to one another (see FIGS. 6 and 7).

Figure 7:
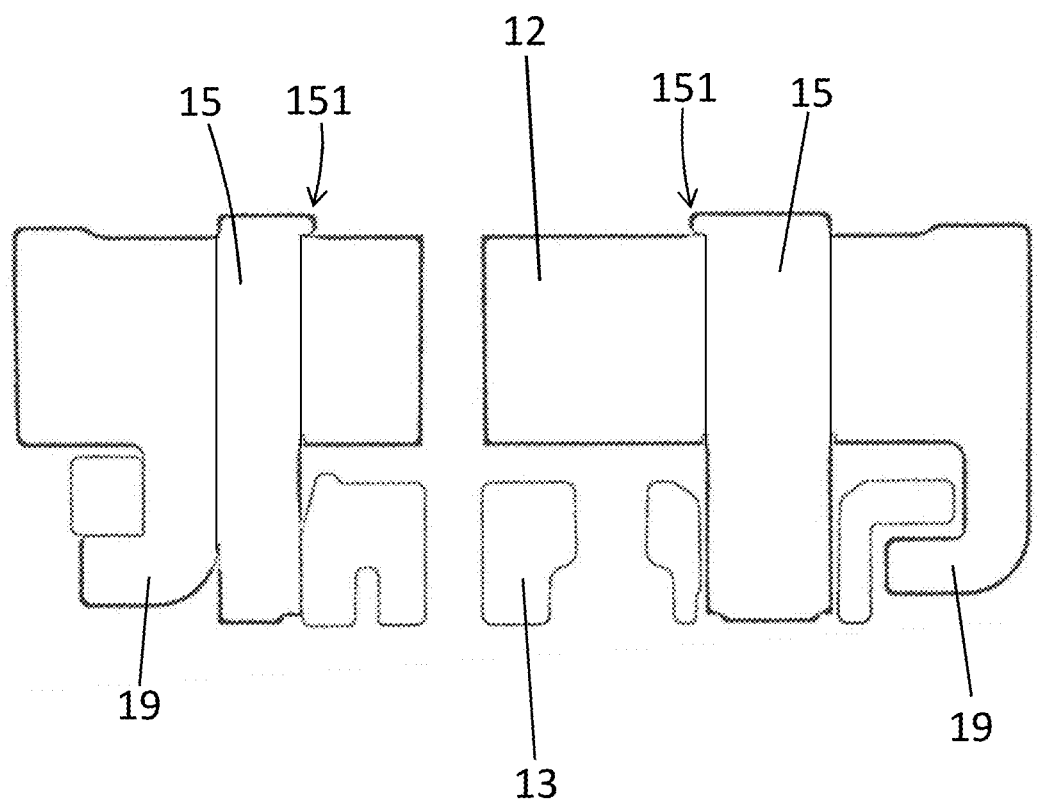

FIG. 7 shows a cross section through the coupling 12 and the cable attachment 13 which are connected or pressed to one another by means of the coupling pins 15. In particular, it can be seen with the help of this representation that the coupling hooks 19 are used for the rough alignment and coupling of the cable attachment 13 and the coupling 12 and these are then pressed against the cable attachment 13 by means of the coupling pins 15.

Figure 8:
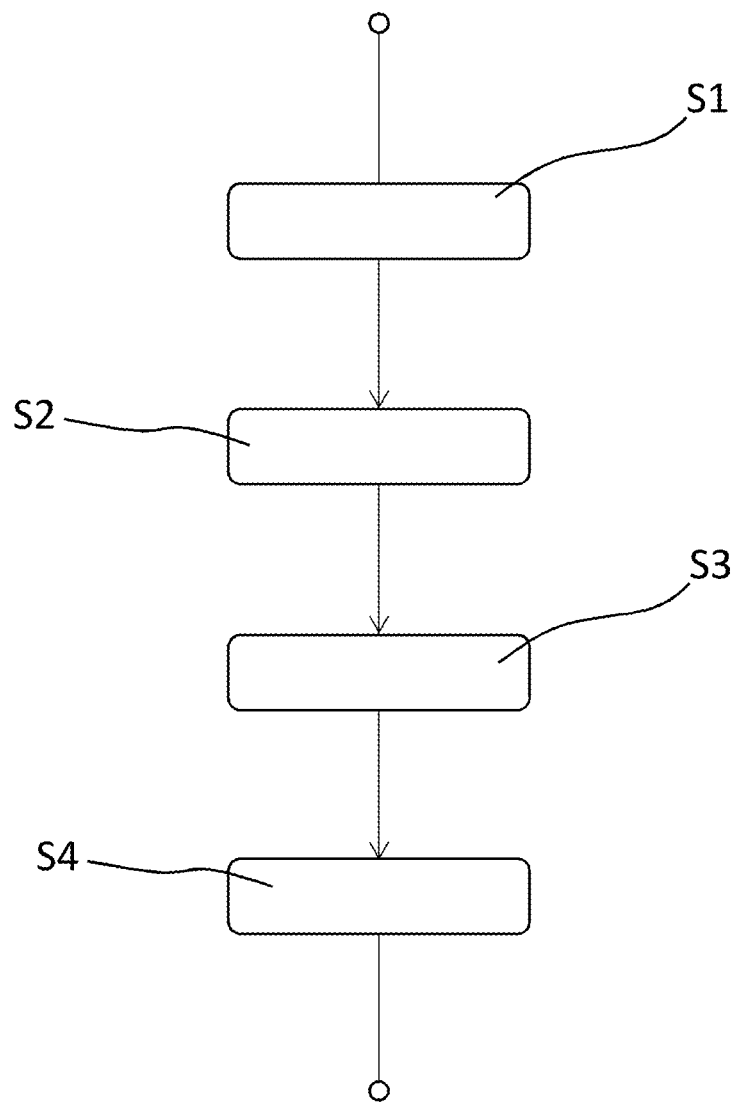
FIG. 8 shows a flow chart for a method for producing the arrangement for the darkening device for the vehicle roof.

A method for producing the arrangement 10 can be implemented according to the flow chart illustrated in FIG. 8. In a step S1 the tension bow 11 and the coupling 12 are provided with the two coupling recesses 17 spaced apart from one another. Provision of the coupling 12 may, in particular, involve a formation of the coupling 12 by means of injection-moulding. In addition, the provision and formation of the coupling 12 also includes the provision and formation of the coupling pins 15 which can be jointly formed in an injection-moulding process and realize an integral plastic formed part. The coupling pins 15 are then connected to the coupling 12 in a substance-bonded manner by a plate-shaped or disc-shaped transition, as illustrated in FIG. 5, for example.

A coupling of the coupling 12 to the tension bow 11 by means of the attachment of the coupling 12 to an elongate end of the tension bow 11 takes place in a step S2.

In a further step S3, the drive cable 14 and the cable attachment 13 are provided with the two coupling recesses 18 spaced apart from one another. The cable attachment 13 is particularly configured as an extrusion coating on an elongate end of the drive cable 14.

A positioning of the coupling 12 and of the cable attachment 13 relative to one another takes place in a further step S4, so that the coupling recesses 17 and 18 are arranged at least sectionally above one another or alongside one another. There then takes place an introduction of the coupling pins 15 into a respective coupling recess 17 of the coupling 12 and into a respective coupling recess 18 of the cable attachment 13 and, as a result of this, coupling of the tension bow 11 to the drive cable 14. According to a preferred integral design with the coupling 12, the introduction of the coupling pins 15 may, in particular, involve a defined separation of the coupling pins 15 from the coupling 12 and a pressing into the respective coupling recesses 17, 18 until the resistance created by the end stops 151 indicates that the end position has been reached.

The arrangement 10 described therefore provides a pinning concept which can create substantially greater robustness of the darkening device, compared with conventional designs, and helps to minimize problems or malfunctions during operation of the darkening device. Moreover, by means of the configuration of the arrangement 10 described, dependence on component tolerances is virtually eliminated and unwanted relative movements between the coupling 12 and the cable attachment 13 are avoided, or at least substantially reduced. The arrangement 10 therefore contributes to a stable and reliable operation of the darkening device in a simple and cost-effective manner.

LIST OF REFERENCE NUMBERS 1 vehicle roof
2 headliner
3 panel
10 darkening device
11 tension bow
12 coupling
13 cable attachment
14 drive cable
15 coupling pin
151 end stop of the coupling pin
16 roller blind
17 coupling recess of the coupling
18 coupling recess of the cable attachment
19 coupling hook
L longitudinal axis of the vehicle roof
S(i) steps in a method for producing the darkening device for the vehicle roof

The invention claimed is:

1. An arrangement for a darkening device for a vehicle roof comprising:
 a tension bow and a coupling, said coupling including at least one coupling recess and being coupled to the tension bow at an elongate end thereof, a drive cable and a cable attachment which includes at least one coupling recess and which is coupled thereto at an elongate end of the drive cable, and at least one coupling pin which extends in each case into the coupling recess of the coupling and into the coupling recess of the cable attachment and connects the coupling to the cable attachment and couples the tension bow to the drive cable, so that the tension bow is movable in a predefined manner by the drive cable;
 wherein the coupling has coupling hooks which engage with predefined recesses on, or in, the cable attachment.

2. The arrangement according to claim 1, wherein the coupling and the cable attachment each have two coupling recesses spaced apart from one another and two coupling pins are provided which each extend into a coupling recess of the coupling and into a coupling recess of the cable attachment and connect the coupling to the cable attachment and couple the tension bow to the drive cable.

3. The arrangement according to claim 1, wherein the at least one coupling pin is integrally configured with the coupling or integrally configured with the cable attachment by injection-moulding.

4. The arrangement according to claim 1, wherein the at least one coupling pin has an end stop which is set up to define an end position when the coupling pin is introduced into the coupling recesses.

5. The arrangement according to claim 1, wherein the coupling and the cable attachment each have a chamfer at an end delimiting the associated coupling recess.

6. A darkening device for a vehicle roof comprising: an arrangement according to claim 1 and a shading element which is coupled to the tension bow and movable by the drive cable.

7. A vehicle roof for a motor vehicle comprising: a panel which is arranged in a roof opening in a headliner of the vehicle roof, and a darkening device according to claim 6 which is coupled to the headliner of the vehicle roof and assigned to the panel.

8. A method for producing an arrangement for a darkening device for a vehicle roof comprising: providing a tension bow, providing a coupling which has at least one coupling recess, coupling of the coupling to the tension bow by attaching said coupling at an elongate end of the tension bow, providing a drive cable with a cable attachment which has at least one coupling recess and which is coupled to the drive cable at an elongate end thereof, providing at least one coupling pin, positioning of the coupling and the cable attachment relative to one another, so that the coupling recesses are arranged above one another, and introducing the at least one coupling pin into the coupling recess of the coupling and into the coupling recess of the cable attachment and coupling of the tension bow to the drive cable, so that said tension bow can be moved in a predefined manner by the drive cable;
 wherein the at least one coupling pin and the coupling or the cable attachment are integrally formed by infection-moulding.

9. The method according to claim 8, wherein the introducing of the at least one coupling pin into the coupling recesses involves a predefined separation from the coupling or from the cable attachment and pressing into the coupling recesses.

10. An arrangement for a darkening device for a vehicle roof comprising: a tension bow and a coupling, said coupling including at least one coupling recess and being coupled to the tension bow at an elongate end thereof, a drive cable and a cable attachment which includes at least one coupling recess and which is coupled thereto at an elongate end of the drive cable, and at least one coupling pin which extends in each case into the coupling recess of the coupling and into the coupling recess of the cable attachment and connects the coupling to the cable attachment and couples the tension bow to the drive cable, so that the tension bow is movable in a predefined manner by the drive cable;
 wherein the at least one coupling pin is integrally configured with the coupling or integrally configured with the cable attachment by injection-moulding.

11. The arrangement according to claim 10, wherein the coupling and the cable attachment each have two coupling recesses spaced apart from one another and two coupling pins are provided which each extend into a coupling recess of the coupling and into a coupling recess of the cable attachment and connect the coupling to the cable attachment and couple the tension bow to the drive cable.

12. The arrangement according to claim 10, wherein the at least one coupling pin has an end stop which is set up to define an end position when the coupling pin is introduced into the coupling recesses.

13. The arrangement according to claim 10, wherein the coupling and the cable attachment each have a chamfer at an end delimiting the associated coupling recess.

14. The arrangement according to claim 10, wherein the coupling has coupling hooks which engage with predefined recesses on, or in, the cable attachment.

15. A darkening device for a vehicle roof comprising: an arrangement according to claim 10 and a shading element which is coupled to the tension bow and movable by the drive cable.

16. A vehicle roof for a motor vehicle comprising: a panel which is arranged in a roof opening in a headliner of the vehicle roof, and a darkening device according to claim 15 which is coupled to the headliner of the vehicle roof and assigned to the panel.

* * * * *